(No Model.)
H. F. WIGHT & H. P. ALDRICH.
RAILWAY GATE AND SIGNAL.
No. 294,172. Patented Feb. 26, 1884.
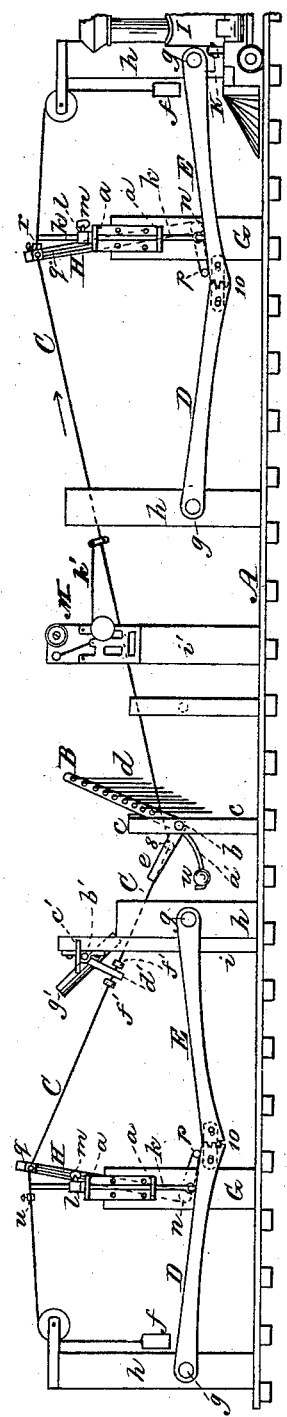
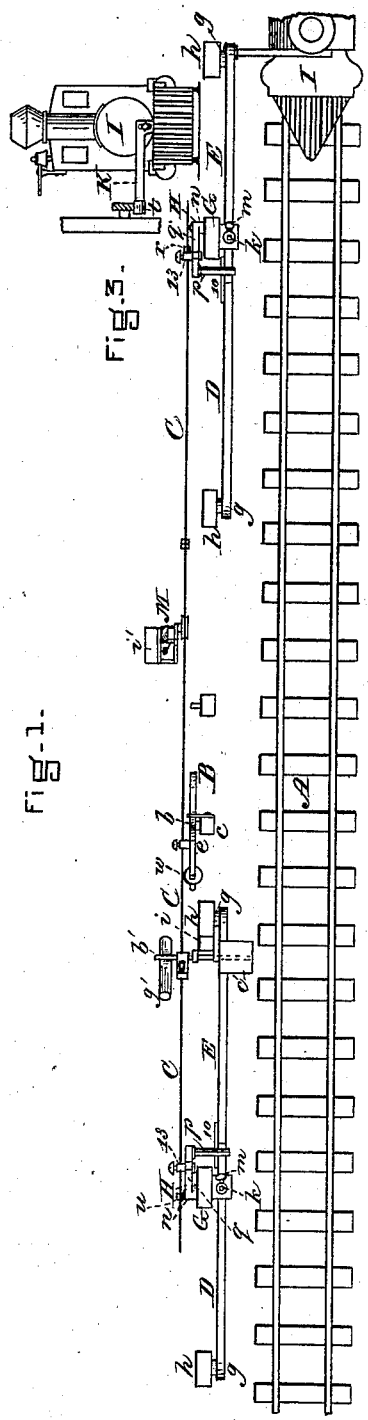
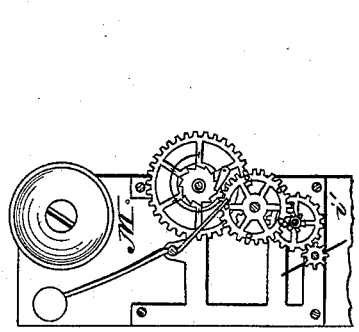
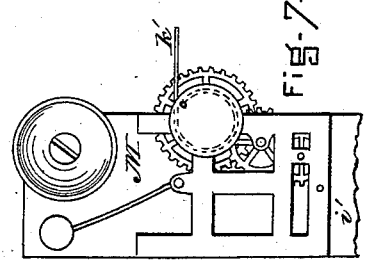
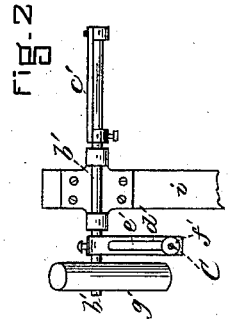
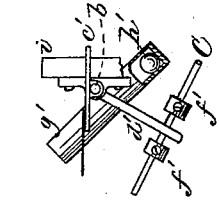
WITNESSES
Chas. A. Pinkham
W. Hambridge
INVENTOR
Henry F. Wight
Hosea P. Aldrich
per C. E. Techemacher
Atty

UNITED STATES PATENT OFFICE.

HENRY F. WIGHT, OF BOSTON, AND HOSEA P. ALDRICH, OF SOMERVILLE, ASSIGNORS OF ONE-HALF TO SAMUEL N. ALDRICH, OF MARLBORO, MASSACHUSETTS.

RAILWAY GATE AND SIGNAL.

SPECIFICATION forming part of Letters Patent No. 294,172, dated February 26, 1884.

Application filed December 8, 1883. (No model.)

*To all whom it may concern:*

Be it known that we, HENRY F. WIGHT, of Boston, in the county of Suffolk and State of Massachusetts, and HOSEA P. ALDRICH, of Somerville, in the county of Middlesex and State aforesaid, citizens of the United States, have invented certain Improvements in Automatic Railway Gates and Signals, of which the following is a full, clear, and exact description, reference being had to the accompanying drawings, making part of this specification, in which—

Figure 1 is a side elevation of a portion of a railway-track having our improved gate and signals applied thereto. Fig. 2 is a plan of the same. Fig. 3 is an end elevation, representing the manner in which the lever mechanism for moving the gate is operated by the passing train; Figs. 4 and 5, details of the signal apparatus; Figs. 6 and 7, details representing the alarm-bell and its clock-work mechanism.

Our invention relates to certain improvements in automatic railway gates and signals; and it consists in a pivoted gate operated by a wire rope or rod connected with a crank-arm operated by levers pivoted above the level of the track to suitable supports placed at the side of the same, said lever mechanism being actuated to move the gate by an arm projecting out from the side of the locomotive or car.

Our invention also consists in a signal and an alarm-bell operated by the above-described wire rope and lever mechanism; and our invention furthermore consists in certain details of construction, as hereinafter set forth and specifically claimed.

In the said drawings, A represents the railway-track, and B the gate, composed of a bar pivoted at $b$ to a post, $c$, and having a series of swinging pendants, $d$, attached thereto.

From the pivoted end of the gate B projects a short upwardly-inclined arm, $e$, to which is secured, at 8, a wire rope, C, which is intended to be supported in suitable guides on posts placed alongside of the track, and extends in both directions from the gate, as seen in Fig. 1, each end being provided with a weight, $f$, which serves to keep the rope tightly stretched, and thus prevent it from sagging or becoming slack.

At any suitable distance from the gate B, as seen at the right-hand side of Fig. 1, is placed a pair of levers, D E, which are pivoted at $g\,g$, above the level of the track A, to posts $h\,h$, at the side of the same, and are jointed together at 10, where the ends are provided with teeth which engage with each other, as seen in Fig. 1. These levers D E, which are curved on their under sides, are inclined downward from their fulcrums to the point 10, and are suspended in this position by a rod, $k$, which is connected to one of them, and slides up through guides $a$, on a central post, G, where it is secured by an adjustable collar, $l$, and set-screw $m$, which prevent the further descent of the levers, but permit them to be raised as desired.

To the post G is pivoted at $n$, a bell-crank lever, H, the crank $p$, of which projects out immediately over the top of one of the levers, near the joint 10, while the long arm $q$ extends upward, and is provided at its upper end with a projection, 13, Fig. 2, through an aperture in which passes the wire gate-rope C, having an adjustable collar or stop, $r$, against which the projection 13, of the arm $q$ bears, in order to move the rope in the direction of the arrow, Fig. 1. The locomotive L or car is provided with a laterally-extending arm, K, Fig. 3, having at its outer end a friction-roll, $t$, which is so placed as to come into contact with the curved under surfaces of the levers E D, and elevate them with a very gradual movement in proportion to the length and inclination of the levers, which thus form a cam, by means of which the crank $p$ is rocked, and the long arm $q$ of the bell-crank H, vibrated, when it will bear against the collar $r$, of the wire rope C, which latter is thus drawn forward in the direction of the arrow, Fig. 1, causing the gate B, to be swung down on its pivot $b$ and closed, as desired. As the arm K, passes from under the levers E D, they descend by their own gravity and resume their normal position, the projection 13 of the arm $q$ slipping over the wire rope C without moving it. After the gate has been closed by the approaching train, the latter, after passing the gate, actuates, by means of its arm K, another pair of jointed levers, D E, (seen at the left-hand side of Fig. 1.) constructed precisely the same as those above described, and connected by similar mechanism with the wire rope C, which is thus drawn in the opposite direction contrary to the arrow by the contact of the arm $q$ with an adjustable collar or stop, $u$, thereon, thereby swinging the gate upward on its pivot $b$, and opening it, as desired, this movement of the rope C bringing its collar $r$ close up to the projection 13 of the arm $q$ of the first-described pair of levers at the right-hand side of Fig. 1, ready for operation, as before. The gate B is provided with a counterbalance-weight, $w$, which is made to slide on a curved guide-arm, $a'$, projecting from the gate, as seen in Fig. 1, and serves to facilitate the movements of the gate in either direction, and holds it securely in position, either open or closed, by reason of its sliding from or toward the fulcrum $b$. Instead of sliding upon a curved guide, $a'$, the counter-weight may, if preferred, consist of a ball adapted to roll in a tubular support. After the gate has been opened by the action of the left-hand pair of levers, and the train has passed by these levers, they will descend by their own gravity, when the arm $q$ will slip over the wire rope C, leaving the collar $u$ in the position seen in Fig. 1, in which case, if the train should back down again past the levers, it would raise the latter without operating the gate, as the arm $q$ would merely slip over the rope C back as far as the collar $u$, and the rope would remain stationary.

To a post, $i$, next to one of the posts $h$ of the left hand pair of levers D E, is secured in suitable bearings a horizontal rock-shaft, $b'$, to which is secured a flat board or narrow plate, $c'$, which may be painted with any striking color, and forms a signal which can be clearly seen for a long distance when turned to bring its flat side into a vertical plane. The shaft $b'$ is provided with an arm, $d'$, having a slot, $e'$, through which slides the wire rope C, having on each side of the arm $d'$ an adjustable collar or stop, $f'$, which is placed at a short distance from the arm $d'$, which, in operating the signal, is not required to be moved to the same extent as the rope C, and thus as the rope C is moved to close the gate the signal-board $c'$ will be turned in a position to notify the engineer that the gate has been properly closed, while if the mechanism has from any cause failed to act and the gate remains open, the signal will remain in the opposite position, notifying the engineer to stop or check his train.

To facilitate the rocking of the signal-shaft $b'$ and cause the signal to be securely held in either position which it occupies, a tubular guide, $g'$, is attached at the center of its length to the shaft $b'$, and within this guide is placed a shifting counter-weight composed of a ball, $h'$, Fig. 4, which, when the guide $g'$ is rocked beyond a horizontal position, rolls down to its opposite end, and in this manner serves to securely hold the signal when turned into either position.

The above-described signal may be located in any suitable position, and, if desired, two or more of these signals can be employed, which can be located at any suitable points.

M represents an alarm-bell and its clockwork mechanism, which may be placed in the station or located on a post, $i'$, near the gate, or elsewhere, to give notice of the approach of the train.

The clock-work is adapted to be set in operation to ring the bell by a wire or cord, $k'$, which is actuated by the wire gate-rope C, with which it may be connected in any suitable manner.

What we claim as our invention, and desire to secure by Letters Patent, is—

1. In an automatic railway-gate, the inclined jointed levers D E, pivoted above the level of the track to supports $h$, and arranged alongside of and parallel with the said track, and adapted to be vibrated together by an arm, K, projecting out laterally from a locomotive or car, in combination with the pivoted gate B, connected by a wire rope, C, with a bell-crank lever, H, actuated by the jointed levers D E, all constructed to operate substantially in the manner and for the purpose described.

2. The combination, with the pivoted gate B, of two pairs of inclined levers, D E, each pair jointed together at 10 and located one pair on each side of the gate, mechanism, substantially as described, adapted to be operated by said jointed levers, and the wire rope C, for connecting the lever mechanism with the gate B, whereby the gate is first closed on the approach of the train by the contact of the arm K with one pair of levers, and then opened after the passage of the train by the contact of the arm K with the other pair of levers, substantially as set forth.

3. In an automatic railway-gate, the combination, with the inclined jointed levers D E, pivoted above the level of the track and arranged alongside of the same, of the adjustable suspension-rod $k$, sliding vertically in guides $a$ on the post G, and provided with a collar or stop, $l$, substantially as and for the purpose set forth.

4. In an automatic railway-gate, the combination, with the inclined jointed levers D E, pivoted above the level of the track, of the crank-arm H, adapted to slip over the wire rope C, passing through its upper end, and operate the same by contact with a collar thereon, substantially as described.

5. The combination, with the inclined jointed levers D E, crank-arm H, and wire rope C, operated as described, of the rock-shaft $b'$, with its arm $d'$ and signal $c'$, operating substantially as set forth.

6. The combination, with the signal $c'$, mounted upon a rock-shaft, $b'$, having a slotted arm, $d'$, vibrated by collars $f'$ upon the wire rope C, of the tubular guide $g'$ and rolling counter-weight or ball $h'$, all constructed to operate substantially in the manner and for the purpose set forth.

7. The combination, with the inclined jointed levers D E, crank-arm H, and wire rope C, operated as described, of the bell-alarm M, adapted to be set in operation by the movement of the rope C, substantially as set forth.

Witness our hands this 6th day of December, A. D. 1883.

HENRY F. WIGHT.
     HOSEA P. ALDRICH.

In presence of—
 P. E. TESCHEMACHER,
 W. J. CAMBRIDGE.